United States Patent
Schroeder et al.

(10) Patent No.: US 10,607,211 B2
(45) Date of Patent: Mar. 31, 2020

(54) METHOD FOR AUTHENTICATING A USER TO A MACHINE (71) Applicant: BUNDESDRUCKEREI GMBH, Berlin (DE)

(72) Inventors: Martin Schroeder, Berlin (DE); Frank Morgner, Gruenheide (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 1286 days.

(21) Appl. No.: 14/762,246

(22) PCT Filed: Jan. 6, 2014

(86) PCT No.: PCT/EP2014/050096
§ 371 (c)(1),
(2) Date: Jul. 21, 2015

(87) PCT Pub. No.: WO2014/114476
PCT Pub. Date: Jul. 31, 2014

(65) Prior Publication Data
US 2015/0371214 A1 Dec. 24, 2015

(30) Foreign Application Priority Data
Jan. 23, 2013 (DE) .......................... 10 2013 201 027

(51) Int. Cl.
*G06Q 20/32* (2012.01)
*H04L 29/06* (2006.01)

(52) U.S. Cl.
CPC ..... *G06Q 20/3229* (2013.01); *G06Q 20/3274* (2013.01); *G06Q 20/3276* (2013.01); *H04L 63/0838* (2013.01); *H04L 63/0853* (2013.01)

(58) Field of Classification Search
CPC ........... G06Q 20/3229; G06Q 20/3274; G06Q 20/3276; H04L 63/0838; H04L 63/0853
(Continued)

(56) References Cited

U.S. PATENT DOCUMENTS

2006/0088166 A1* 4/2006 Karusawa ............. H04L 9/3226
380/277
2008/0183622 A1* 7/2008 Dixon .................. G06Q 20/027
705/44
(Continued)

FOREIGN PATENT DOCUMENTS

WO WO-2012097520 A1 * 7/2012 ............ H04M 17/30

OTHER PUBLICATIONS

Vapen et al. ("2-clickAuth—Optical Challenge-Response Authentication, 2010 International Conference on Availability, Reliability and Security", 2010, pp. 79-86 (Year: 2010).*
(Continued)

*Primary Examiner* — James D Nigh
(74) *Attorney, Agent, or Firm* — Harness, Dickey & Pierce, P.L.C.

(57) ABSTRACT

The disclosure relates to a method for authenticating a user to a machine: generating a challenge by the machine, generating a first pattern, in which the challenge is coded, by the machine, displaying the first pattern on a display device of the machine, optically recording the first pattern by a user device, decoding the first pattern to receive the challenge by the user device, generating a response to the challenge by the user device, generating a second pattern, in which the response is coded, by the user device, displaying the second pattern on a display device of the user device, optically recording the second pattern by the machine, decoding the second pattern to receive the response by the machine, checking the correctness of the response by the machine, and, on the condition that the response is correct, fulfilling a function by the machine.

18 Claims, 5 Drawing Sheets

(58) Field of Classification Search
USPC .......................................................... 705/50
See application file for complete search history.

(56) References Cited

U.S. PATENT DOCUMENTS

| | | | |
|---|---|---|---|
| 2011/0219427 A1* | 9/2011 | Hito | G06F 21/00 |
| | | | 726/3 |
| 2012/0253852 A1* | 10/2012 | Pourfallah | G06Q 20/3276 |
| | | | 705/4 |
| 2013/0087620 A1* | 4/2013 | Sharma | G06K 19/06037 |
| | | | 235/472.01 |
| 2014/0108810 A1* | 4/2014 | Chenna | H04L 9/321 |
| | | | 713/179 |
| 2014/0214688 A1* | 7/2014 | Weiner | G06Q 20/3227 |
| | | | 705/71 |
| 2014/0310185 A1* | 10/2014 | Staflin | H04L 63/18 |
| | | | 705/71 |
| 2016/0162875 A1* | 6/2016 | DeSoto | H04W 12/06 |
| | | | 705/21 |

OTHER PUBLICATIONS

Finzgar et al. ("Use of NFC and QR code identification in an Electronic Ticket System for Public Transport", Aug. 8, 2011, 6 pages) (Year: 2011).*

Kao et al. ("Physical Access Control Based on QR code", Sep. 19, 2011, pp. 285-288, IEEE) (Year: 2011).*

EPO IPR, PCT/EP2014/050096, dated Apr. 23, 2014.

Vapen et al., "2-clickAuth Optical Challenge-Response Authentication", ARES '10 Interantional Converence on Availability, Reliability, and Security, IEEE, Piscataway, NJ, Feb. 15, 2010, pp. 79-86.

Dodson et al., "Secure, Consumer-Friendly Web Authentication and Payments with a Phone", Mobile Computing, Applications, and Services, Lecture Notes of the Institute for Computer Sciences, Social Informatics and Telecommunications Engineering vol. 76, 2012, pp. 17-38.

Dodson et al., "Snap2Pass: Consumer Friendly Challenge-Response Authentication with a Phone", Stanford University Security Workshop, Apr. 30, 2010. http://forum.stanford.edu/events/2010slides/security/BenDodson.pdf.

* cited by examiner

METHOD FOR AUTHENTICATING A USER TO A MACHINE

BACKGROUND

The disclosure relates to a method for authenticating a user to a machine, such as a cash machine or a vending machine, or to a user device, in particular a telecommunications device, such as a smartphone, and also relates to a computer program product, a machine and an electronic system.

A challenge-response authentication system for web applications is known from "Snap2Pass: Consumer-friendly Challenge-Response Authentication with a Phone", Ben Dodson et al., Computer Science Department, Stanford University. In order to log in, the web server sends a QR code to the PC browser of a user, said code containing a cryptographic challenge. The user records an image of the QR code using the camera of his mobile telephone, whereupon the cryptographic response is sent from the mobile telephone to the web server via a mobile telephone link.

This method can be used in the form of "Snap2Pay" and as a payment method (see "Secure, Consumer-Friendly Web Authentication and Payments with a Phone", Ben Dodson et al., Computer Science Department, Stanford University).

BRIEF DESCRIPTION OF THE DRAWINGS

Embodiments of the disclosure will be explained in greater detail hereinafter with reference to the drawings, in which.

DESCRIPTION

The object of the disclosure is therefore to create an improved method for authenticating a user to a machine, and also to create a corresponding user device, a machine, an electronic system and also corresponding computer program products.

The objects forming the basis of the disclosure are achieved in each case by the features of the respective independent claim. Embodiments of the disclosure are specified in the dependent claims.

The expression "authentication of a user" is understood here to mean the confirmation of an alleged property of the user and/or of the user device, in particular the confirmation of the identity of the user or of the user device. The authentication may also include an authorisation, i.e. the granting for example of a certain right of use or access or entry as a result of successful authentication.

A "machine" is understood here to be an apparatus or a system consisting of a plurality of apparatuses, which performs certain tasks independently. In particular, a machine may be a vending machine, for example for selling drinks or cigarettes, a cash machine, in particular a machine for withdrawing cash or a bank terminal for carrying out bank transactions, such as credit transfers, an access control system, in particular an entry control system for controlling the entry to a building, or for controlling the use of a computer, such as a PC. In particular, the machine may be a ticket machine for selling tickets, for example a travel ticket machine or a machine for selling entry tickets, such as cinema or theatre tickets, or entry tickets for large events, such as football games.

Here, a "challenge" is understood to be what is known as the challenge in a challenge-response method, in particular in a challenge-response method based on an asymmetric cryptographic key pair or a symmetric key.

With use of an asymmetric cryptographic key pair, for example for the purpose of authentication, a set challenge is signed by the party to be authenticated using its private key in order to confirm the possession of the private key belonging to the corresponding public key. Another possibility is the encryption of the challenge with the public key of the party to be authenticated, which confirms its possession of the corresponding private key by being able to decrypt the challenge.

The unilateral two pass authentication according to ISO/IEC 9798-2 can be performed with the use of an asymmetric key. Here, both communication partners have the same symmetric key K. The authenticator party sends a random number as a challenge. The party to be authenticated now confirms the possession of the key by sending back the challenge encrypted with the key K. The authenticator party decrypts the response with K and compares the obtained value with the value of the challenge. In order to prevent 'Known Plaintext' attacks, in which case an attacker can determine the key K by the knowledge of the challenge and of the response, the party to be authenticated can also concatenate the challenge with a nonce before encrypting the challenge.

Here, a "response" is understood to be the response in a challenge-response method, i.e. the response generated by the party to be authenticated on account of a set challenge.

Here, a "pattern" is to be understood to be a static optical pattern that is output on a display device and in which information is coded, for example a barcode, in particular a one-dimensional, two-dimensional, high capacity colour barcode, MaxiCode, QR code or DataMatrix code, or a chronological sequence of a plurality of patterns, wherein information is coded by the patterns and the chronological sequence thereof, as is the case for example with a Flicker code. The "Flicker code" is known per se for what is known as the chipTAN comfort method or SmartTAN optic online banking method as employed by savings banks and credit unions.

Here, the user device assigned to the user and/or a secure element assigned to the user acts as party to be authenticated.

Here, a "nonce" is understood in particular to be a character combination, i.e. a combination of numbers and/or letters, which is generally provided for one-time use. In particular, the nonce may be a random number or pseudo-random number.

Here, a "secure element" or "SE" is understood to be a security token, which is also referred to as an authentication token or cryptographic token. For example, this may be a USB stick, a chip card, a memory card, in particular SD card, in particular micro-SD card, or another ID token.

Here, an "ID token" is understood in particular to be a hardware token, such as a value or security document, i.e. in particular an identification document, that is to say an ID document, in particular an electronic personal identification document, passport, residence permit, driver's licence, company ID or a payment means, for example a banknote, a credit card or another proof of authorisation, such as a consignment note or a visa, in particular a chip card, in particular with RFID and/or NFC interface and/or contact-based interface. The ID token may also have another form: for example it can be formed as a key ring, such as an iButton, or as a sticker, for example as a MyMax NFC sticker from TwinLinx.

A secure element may have a contact-based, contactless or dual-mode interface, in particular an RFID, NFC and/or Bluetooth interface and/or a contact-based chip card interface.

Embodiments of the disclosure are particularly advantageous since the communication between the user device and the machine can occur exclusively optically, and therefore there is no need for any electronic communication between the user device and the machine, for example via a network. Relay attacks in particular are eliminated as a result. Potential attacks via the optical communication channel between the user device and the machine are obvious to the user and can be easily detected. Further, such attacks are hindered in that the machine may be largely encapsulated, i.e. without typical interfaces, such as a chip card reader or a keypad, which may form points of attack for manipulation attempts.

A further advantage is that the machine apart from the optical interface, i.e. its display device and its optical sensor, does not necessarily need to have further interfaces, and therefore the machine can be better secured against hardware manipulations. In particular, the optical interface of the machine can be sealed in order to protect it against hardware manipulations, for example by means of an impact-proof plastic or glass pane arranged in front of the optical sensor and/or the display device.

In accordance with embodiments of the disclosure the user device has access to an electronic memory, for example of a secure element, in which the private key of the user and one or more attributes of the user, such as the date of birth of the user, are stored.

In order to generate the response to a challenge, the private key is then used for example by the secure element and in addition the attribute is read out from the memory. Besides the response, the attribute is optically transferred from the user device to the machine. The machine can compare the attribute with a predefined criterion, the satisfaction of which is a prerequisite for providing a desired function of the machine, for example for providing a requested service or selling a requested product that is subject to an age restriction, as is the case for example with cigarettes or alcoholic beverages.

In accordance with an embodiment of the disclosure the user has an identifier, which identifies this user unambiguously. This identifier is stored in the electronic memory, to which the user device has access, and also in a database, to which the machine has access. A user profile is stored in the database for each registered user and contains the identifier of the user in question as access key, said user profile for example including a user account, for example for carrying out a prepaid or postpaid payment method. In particular, the user profile may include a credit amount. In response to a challenge, the user device then answers additionally with the identifier, which is transferred optically from the user device to the machine, such that the machine can charge the user's credit accordingly.

Hereinafter, identical or corresponding elements of the following embodiments will be characterised by like reference signs.

Figure 1:
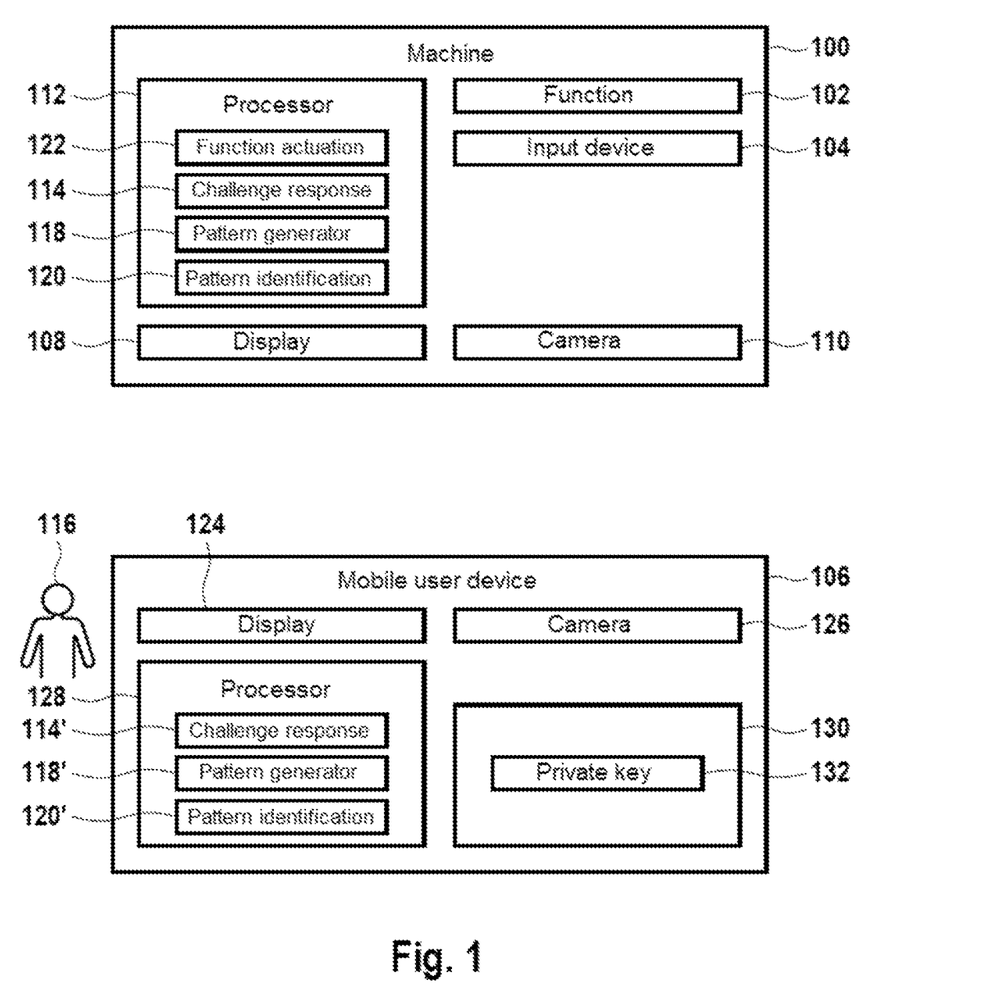
FIG. 1 shows a block diagram of an embodiment of an electronic system according to the disclosure.

FIG. 1 shows a machine 100, such as an access control device. The machine 100 does not necessarily have to be connected to a network, but can be operated independently, i.e. in a "stand-alone" manner.

The machine 100 has a function 102, which here for example may be an electromechanical locking and unlocking device for a turnstile or an automatic door. The machine 100 also has an input device 104, which here for example may be a sensor in order to sense the presence of the user before the turnstile or the automatic door and therefore the request of said user to pass the turnstile or the automatic door.

The machine 100 has an optical interface for communication with a mobile user device 106, which includes a display device 108, i.e. what is known as a display, and an optical sensor, such as a camera 110.

The machine 100 has at least one processor 112 for executing a program module 114, by means of which the steps concerning the machine 100 of a challenge response method for authenticating a user 116 assigned to the user device 106 are performed. The processor 112 is also used to execute a program module 108, which is used to generate an optical pattern, for example to generate a QR code.

The processor 112 is also used to a execute program module 120, by means of the execution of which a pattern recorded by the camera 110, for example also a QR code, is identified and decoded.

The processor 112 is also used to a execute program module 122, by means of the execution of which the function 102 is actuated, i.e. here the locking and unlocking device is actuated The user device 106 also has an optical interface for communication with the machine 100, which includes a display device 124 and a camera 126. The user device 106 also has at least one processor 128 for executing program modules 114', 118' and 120', which correspond in terms of their functions to the program modules 114, 118 and 120 respectively.

The program module 114' is used to carry out the steps of the challenge-response method concerning the user device 106, i.e. to answer a challenge, generated by the program module 114 of the machine 100, by a corresponding response. The program module 118' is used to generate an optical pattern for display on the display device 124, and the program module 120' is used to identify and decode a pattern recorded by the camera 126.

The user device 106 may include an electronic memory 130, in which a private key 132 of an asymmetric cryptographic key pair assigned to the user 116 is stored. The assigned public key and also, with use of a public key infrastructure (PKI), the associated certificate of the PKI may also be stored in the user device 106 and/or in the machine 100. Alternatively, instead of the private key 132, a symmetric key for use in a challenge-response protocol based on a symmetric key may be stored in the memory 130.

The electronic memory 130 may form an integral part of the user device 106 or may belong to a secure element, in particular a chip card, in particular a SIM card, which is located in a card reader of the user device 106.

When the user 116 wishes to pass the turnstile or the automatic door, a prerequisite for this is the authentication of the user to the machine 100. The following procedure is performed for this purpose:

1. The user 116, with his user device 106, enters the detection region of the sensor of the input device 104.

2. On account of the sensing of the user 106, the execution of the program module 114 is started, which then generates a challenge. By way of example, the challenge may be a nonce.
3. Following the generation of the challenge, the program module 118 is started, which generates a first pattern, in which the challenge is coded, for example a QR code. The program module 118 then actuates the display device 108 to output this first pattern.
4. The user 116 records this first pattern from the display device 108 with the aid of the camera 126 of his user device 106.
5. The execution of the programme module 120' is then started in order to identify and decode the pattern contained in this recording. The user device 106 receives the challenge hereby.
6. Following the receipt of the challenge, the execution of the programme module 114' is started in order to generate a response to the challenge. This may be performed such that the challenge, i.e. for example the nonce, is signed with the aid of the private key 132.
7. The execution of the programme module 118' is then started in order to generate a second pattern, which includes the response, i.e. for example the signed nonce inclusive of the public key belonging to the private key 132, and, with use of a PKI, the certificate.
8. The program module 118' then actuates the display device 124, such that the second pattern is displayed on the display device 124.
9. The machine 100, using its camera 110, then records the second pattern from the display device 124, whereupon, by executing the program module 120, the second pattern is identified and decoded, such that the machine 100 receives the response contained in the second pattern.
10. The response is evaluated and checked for correctness by execution of the programme module 114.
11. When the response is correct, the function 102 of the machine 100 is actuated by execution of the programme module 122, for example the turnstile or the automatic door is thus unlocked or opened, such that the user 116 can pass.

In the embodiment considered here it is particularly advantageous that the machine 100 can be fully encapsulated, such that manipulation attempts are ruled out from the outset.

Figure 2:
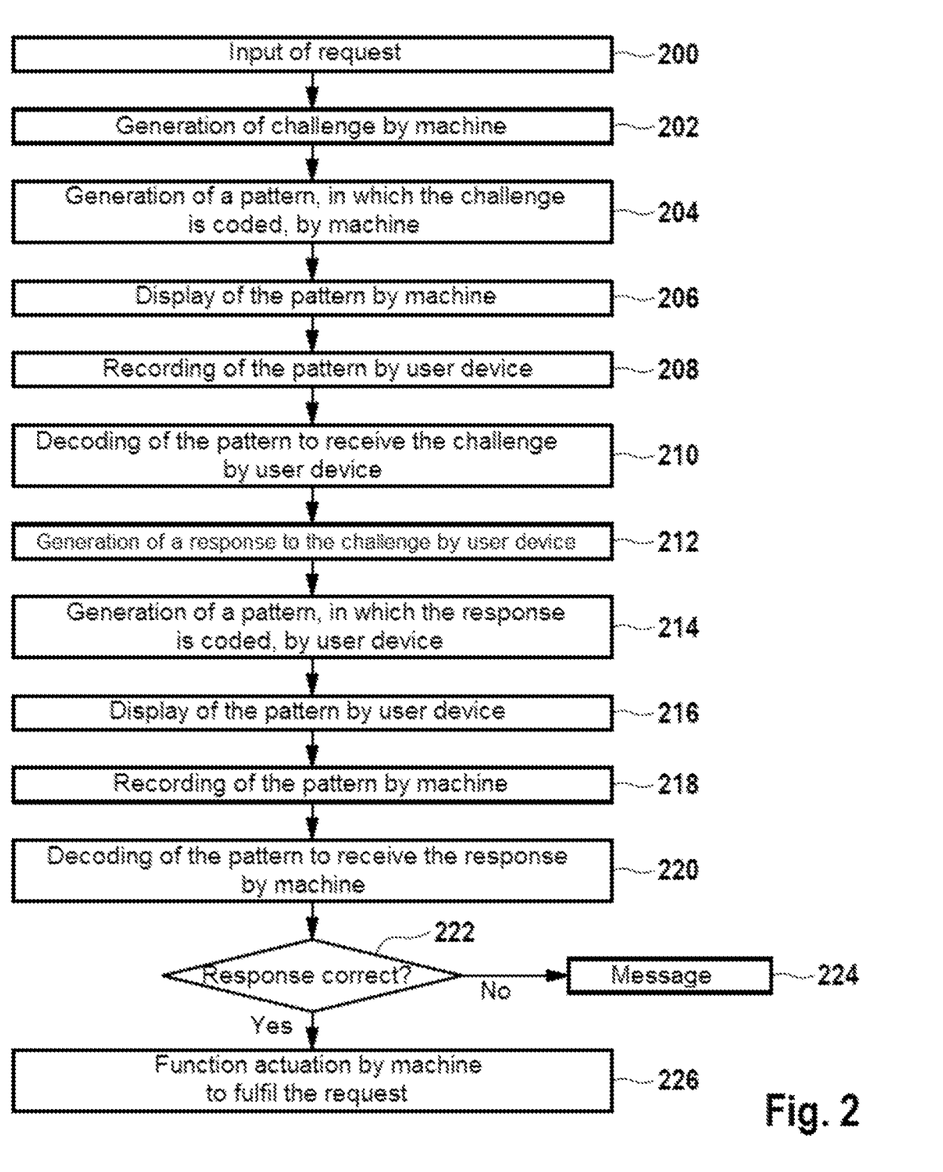
FIG. 2 shows a flow diagram of an embodiment of a method according to the disclosure.

FIG. 2 shows a corresponding flow diagram. In step 200 a request is input into the machine 100. This may occur by sensor, for example in that a proximity sensor of the machine 100 senses the presence of the user 116 and therefore the request of the user to pass, for example, a turnstile or an automatic door when the machine is designed as an access control device.

The input device 104 may also form an integral part of the display device 108, which is then formed as what is known as a touchscreen. The user 116 can then select a desired function 102 of the machine 100 via the display 108, which includes the input device 104 as an integral part, the provision of the function requiring the authentication of the user 116.

In step 202 the machine 100 generates a challenge, for example a nonce, on account of the input of the request. The machine 100 then generates a first optical pattern, such as a QR code, in which the challenge is coded (step 204). This first pattern is displayed by the machine on the display device 108 in step 206.

The user 116 then records the first pattern from the display device 108 with the aid of the camera 126 of his user device 106 (step 208), whereupon the first pattern is identified and decoded by the user device 106 in the recording, such that the user device thus receives the challenge.

In step 212 the user device generates a response to this challenge, which is coded in step 214 in a second pattern, which is then displayed in step 216 on the display device 124 of the user device 126. This second pattern is then recorded by the machine 100 using its camera 110 (step 218), the second pattern in the recording is detected, and the second pattern is decoded in step 220, such that the machine 100 thus receives the response of the user device 106.

In step 222, the machine 100 then checks whether the response is correct. If this is not the case, the sequence is thus aborted in step 224, for example by the output of a corresponding message on the display device 108 and/or by an acoustic signal. On the contrary the user 116 is authenticated to the machine 100, such that the function of the machine 100 previously requested in step 200 is then released in step 226, and the function is provided by the machine 100.

Figure 3:
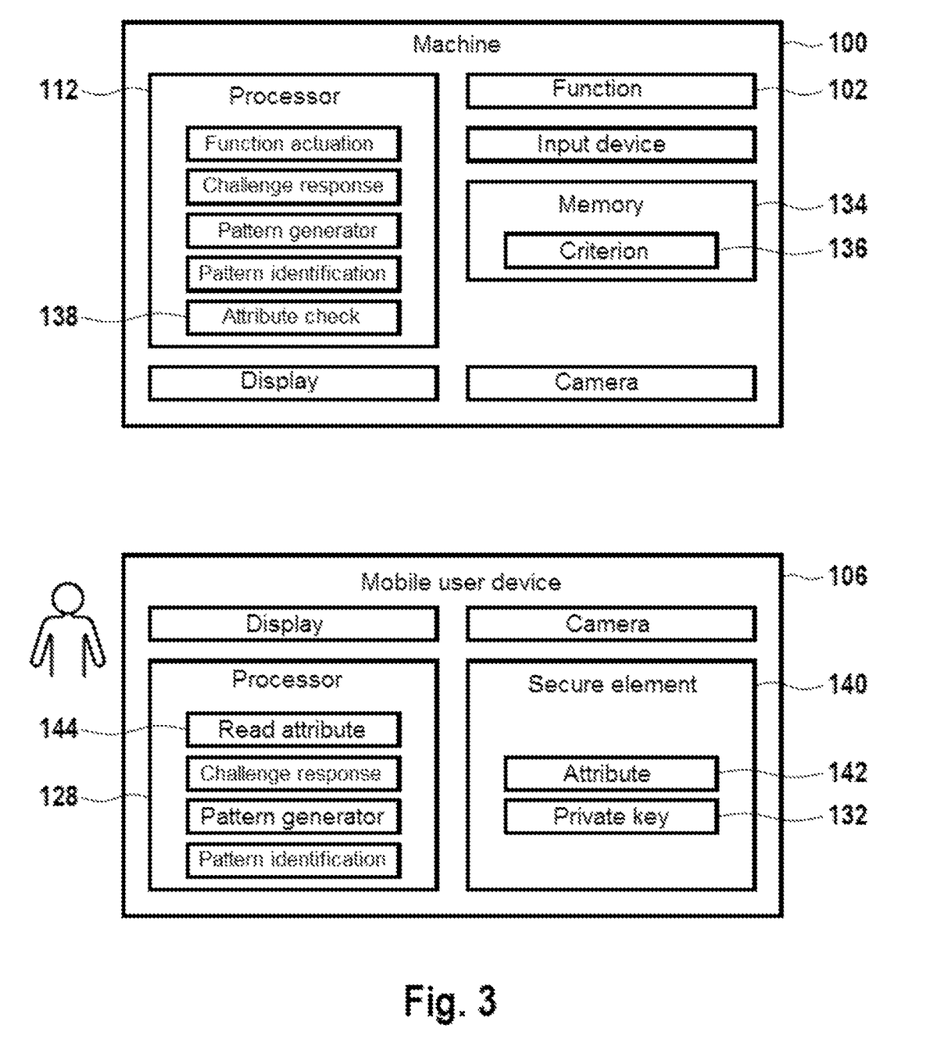
FIG. 3 shows a block diagram of a further embodiment of an electronic system according to the disclosure.

FIG. 3 shows a further embodiment of an electronic system according to the disclosure. In accordance with the embodiment according to FIG. 3, in order to provide the requested function 102 of the machine 100, it is additionally necessary, besides the authentication of the user, that the user device 106, a secure element 140 and/or the user 116 himself satisfies a predefined criterion, for example the fact that the user 116 is of a minimum age and/or has a minimum credit.

For this purpose the machine 100 has an electronic memory 134, in which the predefined criterion 136 is stored. The processor 112 is also used in the embodiment considered here to execute a program module 138 in order to check whether the user 116 meets this criterion 136.

The user device 106 in the embodiment considered here has a secure element 140, in which, besides the private key 132, an attribute of the user 116 is stored, such as the date of birth or a credit of the user 116.

The processor 128 of the user device 106 is used here to execute a program module 144 for reading the attribute 142.

The user 116 is authenticated to the machine in the embodiment considered here analogously to the embodiments according to FIGS. 1 and 2.

In addition, following the receipt of the challenge by the user device 106, the attribute 142 is read out from the secure element 140 by execution of the programme model 144 and is coded in the second pattern. By recording and decoding the second pattern by means of the machine 100, this then also receives the attribute 142 in addition to the response. By executing the program module 138, the machine 100 checks whether the attribute 142 satisfies the predefined criterion 136, for example whether the user 116 is of a predefined minimum age or has a predefined minimum credit.

If both the response is correct and the attribute 142 satisfies the criterion 136, the function 102 is released and performed by the machine 100.

In addition, it may be that the user 116 must firstly be authenticated to the user device 106, for example by inputting a PIN. It is thus ensured that the user 116 is also actually assigned to the user device 106 or the secure element 140. Alternatively, the possession of the user device 106 is sufficient in order to ensure this assignment.

Figure 4:
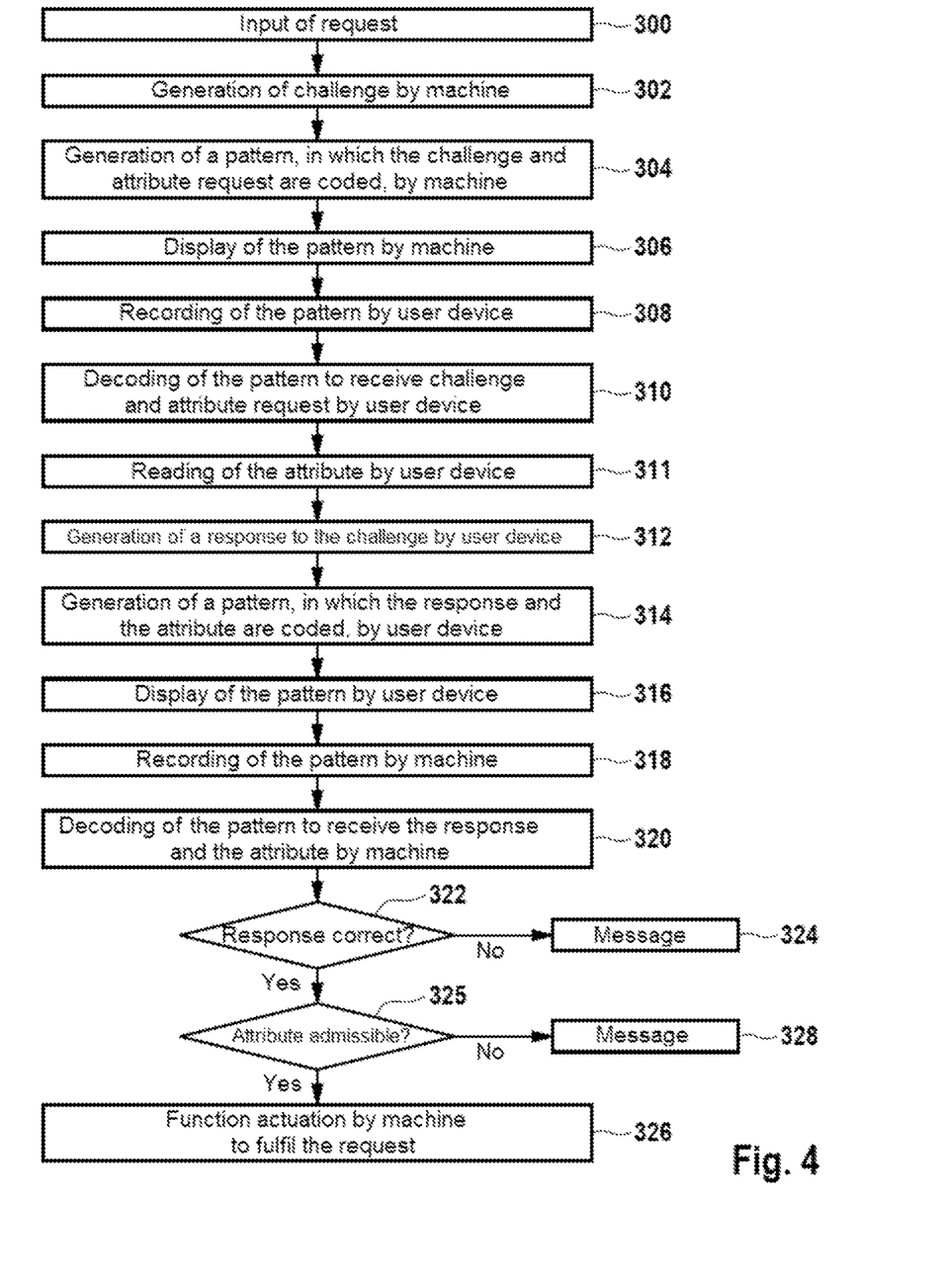
FIG. 4 shows a flow diagram of a further embodiment of a method according to the disclosure.

FIG. 4 shows a corresponding flow diagram, wherein steps 300 to 326 corresponded to steps 200 to 226. Step 304 differs from step 204 in that, besides the challenge, an attribute request is coded in the first pattern, such that the machine 100 signals to the user device 106 that the user device is to transfer a certain attribute, for example the attribute 142, to the machine 100.

In step 310 this attribute request is received, in addition to the challenge, by the user device 106, and this attribute 142 is then read out from the user device 106 in step 311. In step 314, in addition to the response, this attribute 142 is accordingly also coded in the second pattern, and therefore the machine 100 receives this attribute in step 320.

If the check in step 322 reveals that the response is correct, it is additionally checked in step 325 whether the attribute 142 is admissible, i.e. whether it satisfies the criterion 136. If this is the case, the requested function is thus released and performed in step 326; otherwise the process is aborted in step 328 and for example a message signalling this is output via the display device 108.

Figure 5:
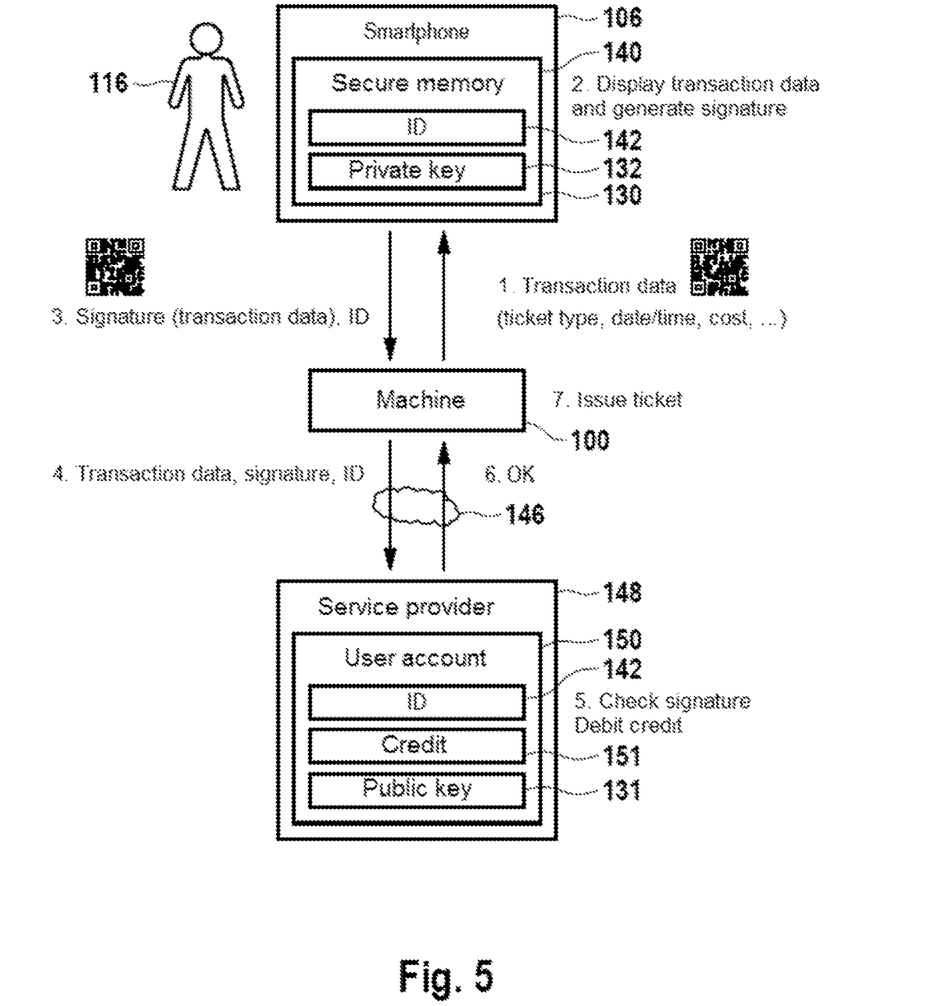
FIG. 5 shows a block diagram of a further embodiment of an electronic system according to the disclosure.

FIG. 5 shows a block diagram of a further embodiment of an electronic system according to the disclosure. In this embodiment the machine 100 is formed as a ticket machine, for example a travel ticket machine.

The machine 100 can access a database 148, for example of a service provider, for example via a network 146. A database entry 150 is stored in the database for each recorded user and can be accessed with an identifier (ID) 142 unambiguously assigned to the relevant user as access key. The database entry 150 also includes a user account for a prepaid or postpaid payment method, for example a prepaid credit amount 151. The database entry 150 may also include the public key 131 of the user in question, for whom the database entry 150 is generated.

In order to purchase a ticket, the user 116 may proceed as follows:

1. The user first selects the desired ticket on the machine 100, for example via the display 108, which may be formed as a touchscreen (see embodiment according to FIG. 1). By this selection of a desired ticket, the user 116 defines transaction data, such as the ticket type, date and time, for example of the departure or of the start of a desired event, the cost, etc. This transaction data is used in the embodiment considered here as a challenge, which is optically transferred from the machine 100 in the form of the first pattern to the user device 106, which here is embodied for example as a smartphone. In the embodiment considered here the ID 142 of the user 116 is stored in the smartphone 106 as an attribute 142 in the secure element 140 (see embodiment according to FIG. 3).
2. The user device 106 responds here to the received challenge, i.e. the transaction data, by generating a response in which this transaction data is signed with the aid of the private key 132. Transaction data may also be displayed on the display device 124 of the user device 106.
3. By way of example, following the input of a confirmation into the user device 106 by the user 116, the second pattern is generated, in which, besides the signed transaction data, i.e. the response, the ID 142 of the user 116 read out from the secure element 140 is included, such that the machine 100 also receives the ID of the user 116 in addition to the response.
4. The machine 100 then sends the transaction data, the signature thereof received from the user device 106, and the ID 142 of the user 116 to the database 148, for example via a network 146. Alternatively, the database 148 may also form an integral part of the machine 100, such that there is no need for a transfer via the network 146.
5. Following receipt of this data, the database 148 accesses the database entry 150 with the aid of the ID 142 in order to read out the public key 131 of the user 116 and to verify the signature with the aid of this public key 131. If the signature is valid, the cost value in accordance with the transaction data is then debited from the credit 151 of the user 116 stored in the database entry 150, and the database 148 then signals the successful execution of this process to the machine 100, which then outputs the desired ticket.

It is also particularly advantageous with this embodiment that it is not necessary for the user device 106 to communicate via a network with the machine 100, which hinders the possibility of relay attacks. A further advantage is that the purchase of the ticket is then also possible when the user device 106 is located outside the radio coverage of a mobile network or a WLAN.

Alternatively, a challenge-response method based on an asymmetric key can also be used with this embodiment. In this case the database entry 150 instead of the public key 131 contains the symmetric key of the user in question for whom the database entry 150 is generated. This symmetric key is then stored in the memory 140 the user device 106 instead of the private key 132.

Some aspects and features of the disclosed embodiments are set out in the following numbered items:

1. A method for authenticating a user (116) to a machine (100) comprising the following steps: generating a challenge by the machine, generating a first pattern, in which the challenge is coded, by the machine, displaying the first pattern on a display device (108) of the machine, optically recording the first pattern by a user device (106), decoding the first pattern to receive the challenge by the user device, generating a response to the challenge by the user device, generating a second pattern, in which the response is coded, by the user device, displaying the second pattern on a display device (124) of the user device, optically recording the second pattern by the machine, decoding the second pattern to receive the response by the machine, checking the correctness of the response by the machine, and on the condition that the response is correct, fulfilling a function by the machine.
2. The method according to item 1, wherein the user inputs into the machine a transaction request for requesting a transaction, wherein the challenge transaction data includes the requested transaction, and wherein the response is generated by signing of the transaction data by the user device, wherein the fulfilment of the function is the execution of the requested transaction.
3. The method according to items 1 or 2, wherein the machine is a vending machine, such as a drinks machine or a cigarette machine, or is a cash machine, wherein the second pattern contains an attribute of the user, which is received by decoding the second pattern by the machine, wherein the function is fulfilled by the machine only under the further condition that the attribute of the user satisfies a predefined criterion (136).
4. The method according to one of the preceding items, wherein the machine is a ticket machine, in particular a travel ticket machine, wherein the challenge contains one or more of the following data items: ticket type, travel dates, in particular departure location, destination, departure time, arrival time, and/or cost, wherein the function of the generation of the ticket requested by the user is fulfilled by the machine on the condition of the correctness of the response.

5. The method according to one of the preceding items, wherein the machine is an access control system, wherein the function is provided by the machine, by cancelling an access block for the user, on the condition of the correctness of the response.

6. The method according to one of the preceding items, wherein the first and/or the second pattern is/are formed as a QR code or Flicker code.

7. The method according to one of the preceding items, wherein the first and/or the second pattern is/are formed in each case as a static pattern or as a chronological sequence of a plurality of patterns.

8. The method according to one of the preceding items, wherein the user device has a wireless network interface, in particular for connection to a digital mobile network and/or a WLAN, and wherein there is no connection of the network interface to a network.

9. The method according to one of the preceding items, wherein the machine has access to a database (148), in which registration data of users is stored, wherein the registration data of the user includes at least one identifier (142) of the user and account data (151) of the user, and wherein the user device has access to an electronic memory (140), in which the identifier of the user and a private key (132) of an asymmetric cryptographic key pair are stored, wherein the challenges include transaction data of a requested transaction, the response is generated by signing of the transaction data with the aid of the private key, and the second pattern additionally to the response contains the identifier of the user, and the identifier is received by decoding the second pattern by the machine, such that the machine, with the identifier as access key, accesses the database in order to charge the account of the user in accordance with the requested transaction.

10. The method according to item 9, wherein the public key (131) of the user belongs to the registration data stored in the database.

11. The method according to one of the preceding items 1 to 8, wherein the machine has access to a database (148), in which registration data of uses is stored, wherein the registration data of the user includes at least one identifier (142) of the user, a symmetric key of the user and account data (151) of the user, and wherein the user device has access to an electronic memory (140), in which the identifier of the user and the symmetric key stored, wherein the challenges include transaction data of a requested transaction, the response is generated by encryption of the transaction data with the aid of the symmetric key, and the second pattern additionally to the response contains the identifier of the user, and the identifier is received by decoding of the second pattern by the machine, such that the machine, with the identifier as access key, accesses the database in order to charge the account of the user in accordance with the requested transaction.

12. The method according to items 9, 10 or 11, wherein the user device is a telecommunications device, in particular a smartphone, and wherein the smartphone has access to a secure element, which contains the electronic memory, wherein the secure element in particular is a chip card, such as a SIM card.

13. A computer program product, in particular a digital storage medium, having executable program instructions (114', 118', 120') for authenticating a user (116) to a machine (100), wherein, by execution of the programme instructions by a user device, the following steps are performed: optically recording a first pattern from the display device of the machine, decoding the first pattern to receive a challenge of the machine, generating a response to the challenge, generating a second pattern, in which the response is coded, and displaying the second pattern on a display device of the user device.

14. A computer program product, in particular a digital storage medium, having executable program instructions (114, 116, 120, 122) for authenticating a user (116) to a machine (100), wherein, by executing the program instructions by the machine, the following steps are performed: generating a challenge, generating a first pattern, in which the challenge is coded, displaying the first pattern on a display device (108) of the machine, optically recording a second pattern from a display device (124) of the user device by the machine, decoding the second pattern to receive the response by the machine, checking the correctness of the response by the machine, and on the condition that the response is correct, fulfilling a function by the machine.

15. A machine, in particular a vending machine, ticket machine, cash machine or access control system, comprising a challenge generator (114) for generating a challenge, a pattern generator (118) for generating a first pattern, in which the challenge is coded, a display device (108) for displaying the first pattern, an optical sensor (110) for recording a second pattern from a display device (124) of a user device (106), a pattern decoder (120) for decoding the second pattern in order to receive a response of the user device to the challenge, a check module (114) for checking the correctness of the response, and a control module (122) for fulfilling a function on the condition that the check by the check module reveals the correctness of the response.

16. The machine according to item 15, comprising means for accessing a database (150), in which registration data (131, 142, 151) of users is stored, wherein the registration data of a user includes an identifier of the user and account data of the user, wherein the pattern decoder is configured to decode an identifier contained in the second pattern, and the means for access are configured to access the database with the aid of the received identifier as access key in order to charge the account of the user in accordance with the function fulfilled by the machine.

17. An electronic system comprising a machine according to item 15 or 16 and a user device, in particular a telecommunications device, for example a smartphone, wherein the user device comprises the following: an optical sensor (126) for recording the first pattern from the display device of the machine, a pattern decoder (120') for decoding the first pattern to receive the challenge by the user device, a response generator (114') for generating a response to the challenge, a pattern generator (118') for generating the second pattern, in which the response is coded, and a display device (124) for displaying the second pattern.

LIST OF REFERENCE SIGNS 100 machine
102 function
104 input device
106 user device
108 display device
110 camera
112 processor
114 program module
114' program module
116 user
118 program module 118' program module
120 program module
120' program module
122 program module
124 display device
126 camera
128 processor
130 electronic memory
131 public key
132 private key
134 memory
136 criterion
138 program module
140 secure element
142 attribute
144 program module
146 network
148 database
150 database entry
152 credit

What is claimed is:

1. A method for authenticating a user to a machine without accessing a network, comprising:
   generating a challenge by the machine;
   generating a first pattern, in which the challenge is coded, by the machine;
   displaying the first pattern on a display device of the machine;
   optically recording the first pattern by a user device;
   decoding the first pattern to receive the challenge by the user device;
   generating, from the received challenge, a response to the challenge by the user device;
   generating a second pattern, in which the response is coded, by the user device;
   displaying the second pattern on a display device of the user device;
   optically recording the second pattern by the machine;
   decoding the second pattern to receive the response by the machine, wherein the second pattern contains an attribute of the user, which is received by decoding the second pattern;
   checking the correctness of the response by the machine; and
   in response to the response being correct and the attribute of the user satisfying a predefined criterion, fulfilling a function by the machine.

2. The method according to claim 1, the method further comprising:
   inputting a transaction request into the machine by the user; and wherein
   the transaction request includes challenge transaction data, includes the response is generated by signing of the challenge transaction data by the user device, and
   the fulfilment of the function is the execution of the transaction request.

3. The method according to claim 1, wherein
   the machine is a vending machine, a drinks machine, a cigarette machine, or a cash machine.

4. The method according to claim 1, wherein
   the machine is a travel ticket machine;
   the challenge contains one or more of: ticket type, travel dates, destination, departure time, arrival time, and/or cost; and
   the function fulfilled by the machine is the generation of a ticket requested by the user, the function being fulfilled by the machine based on the correctness of the response.

5. The method according to claim 1, wherein the machine is an access control system, and the function is provided by the machine, by cancelling an access block for the user, based on the correctness of the response.

6. The method according to claim 1, wherein the first and/or the second pattern is/are formed as a QR code or Flicker code.

7. The method according to claim 1, wherein the first and/or the second pattern is/are formed in each case as a static pattern or as a chronological sequence of a plurality of patterns.

8. The method according to claim 1, wherein
   the user device has a wireless network interface; and
   there is no connection of the wireless network interface to a network.

9. The method according to claim 1, wherein
   the method further includes inputting a transaction request into the machine by the user, and wherein
   the machine has access to a database, the database including registration data of users;
   the registration data of the user includes at least one identifier of the user and account data of the user;
   the user device has access to an electronic memory, the electronic memory including the identifier of the user and a private key of an asymmetric cryptographic key pair;
   the challenge includes transaction data of the transaction request;
   the response is generated by signing of the transaction data with the aid of the private key;
   the second pattern includes the identifier of the user; and
   the identifier is received by decoding the second pattern by the machine and the machine, with the identifier as access key, accesses the database in order to charge the account of the user in accordance with the transaction request.

10. The method according to claim 9, wherein the registration data stored in the database includes a public key of the user.

11. The method according to claim 1, wherein
    the method further includes inputting a transaction request into the machine by the user, and wherein
    the machine has access to a database, in which registration data of users is stored;
    the registration data of the user includes at least one identifier of the user, a symmetric key of the user and account data of the user; and
    the user device has access to an electronic memory, in which the identifier of the user and the symmetric key are stored; and
    the challenge includes transaction data of the requested transaction, the response is generated by encryption of the transaction data with the aid of the symmetric key, and the second pattern additionally to the response contains the identifier of the user, and the identifier is received by decoding of the second pattern by the machine and the machine, with the identifier as access key, accesses the database in order to charge the account of the user in accordance with the requested transaction.

12. The method according to claim 9, wherein
    the user device is a smartphone;

the smartphone has access to a secure element, which contains the electronic memory; and the secure element in particular is a chip card.

13. A machine, in particular a vending machine, ticket machine, cash machine or access control system, comprising:

a machine processor configured to execute computer readable instructions to,
  generate a challenge, and
  generate a first pattern, in which the challenge is coded;
a display device configured to display the first pattern; and
an optical sensor configured to record a second pattern from a display device of a user device, wherein
the machine processor is further configured to execute the computer readable instructions to:
  decode the second pattern in order to receive a response of the user device to the challenge, wherein the response is generated from the challenge received by the user device, and wherein the second pattern contains an attribute of the user that is received by decoding the second pattern,
  check the correctness of the response, and
  fulfill a function based on the check module revealing the correctness of the response and the attribute of the user satisfying a predefined criterion.

14. The machine according to claim 13, comprising:
means for accessing a database, in which registration data of users is stored;
wherein the registration data of a user includes an identifier of the user and account data of the user,
the pattern decoder is configured to decode an identifier contained in the second pattern, and
the means for access are configured to access the database with the aid of the received identifier as access key in order to charge the account of the user in accordance with the function fulfilled by the machine.

15. An electronic system comprising:
a machine according to claim 13; and
a telecommunications user device, and
wherein the telecommunications user device comprises,
  an optical sensor for recording the first pattern from the display device of the machine;
  a telecommunications user device processor configured to execute computer readable instructions to,
    decode the first pattern to receive the challenge by the user device,
    generate the response to the challenge, and
    generate the second pattern, in which the response is coded; and
  a display device for displaying the second pattern, wherein the telecommunications user device is authenticated to the machine without accessing a network.

16. The method according to claim 1, further comprising:
sensing, by the machine, the user being in proximity to the machine, wherein the generating the challenge by the machine is based on the user being sensed in proximity to the machine.

17. The method according to claim 1, further comprising:
selecting transaction data on a display of the machine by the user, wherein the transaction data is the challenge generated by the machine, the response is generated by signing of the transaction data by the user device, and the fulfilment of the function is the execution of the transaction data.

18. The method according to claim 1, wherein the attribute of the user comprises at least one of a financial attribute and an age attribute.

* * * * *